United States Patent Office 3,829,494
Patented Aug. 13, 1974

3,829,494
STABILIZED 2-(2-AMINO ETHER) ETHANOL AND METHANE
Ernest Leon Yeakey and Philip Hotchkiss Moss, Austin, Tex., assignors to Jefferson Chemical Company, Inc., Houston, Tex.
No Drawing. Filed Apr. 11, 1973, Ser. No. 350,003
Int. Cl. C07c 89/04
U.S. Cl. 260—584 C                10 Claims

ABSTRACT OF THE DISCLOSURE

An improved 2-(2-aminoethoxy) ethanol composition for purifying gases containing acid gas impurities, such as natural gas, and a method for preparing same is disclosed. The improved 2-(2-aminoethoxy) ethanol compound, useful for removing impurities such as acid gases from natural gas has improved resistance against decomposition and/or degradation in the presence of said acid gases by incorporating into 2-(2-aminoethoxy) ethanol a stabilizing amount of a water soluble trialkanolamine.

BACKGROUND OF THE INVENTION

1. Field of the Invention

This invention relates to the art of treating gases to remove impurities therefrom and more particularly pertains to an improved composition and method of preparing same for use in removing impurities of acid gases in natural gas that has improved resistance to decomposition and/or degradation even after extended periods of exposure to the acid gas impurities.

2. Description of the Prior Art

The utilization of 2-(2-aminoethoxy) ethanol for the removal of impurities from gases such as air, natural gas, and the like is well known in the art as evidenced by U.S. Pat. No. 2,712,978. 2-(2-aminoethoxy) ethanol is especially effective in removing acid gas impurities, such as carbon dioxide, hydrogen sulfide, carbonyl sulfide, etc., from natural gas. The process is commonly known as "sweetening" natural gas.

Natural gas "sweetening" processes are conventionally based upon the principle of absorption and adsorption. Generally, sour gas, i.e., gas containing impurities, is exposed and/or contacted with a suitable material or compound that absorbs or adsorbs the impurities. The process is usually carried out at a fairly low temperature e.g., 55–250° F. and at above atmospheric pressure. The impurity-laden absorbant material is then treated in a known manner to remove the impurities and the absorbant recycled for further contact with sour gas. "Sweetening" processes and apparatus utilized are well known in the art and therefore, will not be further discussed in detail.

The utilization of 2-(2-aminoethoxy) ethanol to "sweeten" natural gas has gained wide acceptance in the industry in view of its superior performance in impurity removal over other absorbing or "scrubbing" compositions, e.g., monoethanolamine aqueous solutions. However, even 2-(2-aminoethoxy) ethanol, when exposed to acid gases for extended continuous time periods, will decompose or degrade and thus, must be replaced from time to time. Tests have shown that when 2-(2-aminoethoxy) ethanol solutions are continuously exposed to acid gas impurities such as carbon dioxide, carbonyl sulfide and the like, with or without hydrogen sulfide, the 2-(2-aminoethoxy) ethanol is slowly converted to a urea, bis-(2-hydroxyethoxyethyl) urea (BHEEU). BHEEU is ineffective in removing the acid gas impurities from natural gas. Thus, the 2-(2-aminoethoxy) ethanol must be replaced or regenerated and added to periodically to retain purification efficiency.

There are a few processes known in the art for improving the stability of certain purification compositions against degradation in the presence of acid gas impurities in natural gas "sweetening" processes. For example, Singh, in U.S. Pat. 3,535,260, teaches that aqueous monoethanolamine solutions can be stabilized against degradation in the presence of certain acid gases by incorporating into the solution certain tertiary amines. On the other hand, there is no known prior art for preventing or retarding the degradation of 2-(2-aminoethoxy) ethanol to BHEEU when the composition is used to "sweeten" natural gas.

It is accordingly, an object of the invention to present a method for stabilizing 2 - (2 - aminoethoxy) ethanol against degradation and/or decomposition in the presence of acid gases.

It is another object of the instant invention to present an improved composition for use in removing acid gas impurities from natural gas that has improved resistance against degradation and/or decomposition in the presence of acid gas impurities.

It is another object of the invention to present an improved process for removing acid gas impurities from natural gas wherein natural gas is contacted with or exposed to an improved 2-(2-aminoethoxy) ethanol compound comprised of 2-(2-aminoethoxy) ethanol and a stabilizing amount of a water soluble trialkanolamine that has improved resistance to degradation in the presence of the acid gas impurities.

Other objects and advantages of the invention, if not set forth specifically herein, will become readily apparent from the ensuing summary and description.

SUMMARY OF THE INVENTION

In a process for removing acid gas impurities from natural gas, the natural gas is contacted with or exposed to an improved 2-(2-aminoethoxy) ethanol compound that has improved stability and resistance against degradation in the presence of the acid gas impurities. 2-(2-aminoethoxy) ethanol is stabilized against degradation and/or decomposition by incorporating therein a stabilizing amount of a water soluble trialkanolamine, preferably a tri-(lower alkanol)amine. The resulting improved 2-(2-aminoethoxy) ethanol composition can be utilized to purify natural gas without substantial formation, if any, of BHEEU therefrom.

DESCRIPTION OF THE INVENTION

In the practice of our invention, 2-(2-aminoethoxy) ethanol is stabilized against degradation in the presence of acid gases, such as carbon dioxide, hydrogen sulfide, carbonyl sulfide, and the like by incorporating therein a stabilizing amount of a water soluble trialkanolamine. Preferably a tri-(lower alkanol)amine, wherein the alkanol groups have from 2 to about 4 carbon atoms, is utilized. Compounds which have been found to be especially effective include triethanolamine, triisopropanolamine, diethanolisopropanolamine and mixtures thereof.

When stabilizing 2-(2-aminoethoxy) ethanol, it has been determined that the compounds of the present invention provide the most effective stability when they are incorporated in amounts of between about 1 to about 50 weight percent of the stabilizing trialkanolamine to the 2-(2-aminoethoxy) ethanol. When added in these amounts, the above-described water soluble trialkanolamines, especially triethanolamine or triisopropanolamine, prevent or substantially retard the formation of bis-(2-hydroxyethoxyethyl) urea when the stabilized 2-(2-aminoethoxy) ethanol composition is exposed to and contacted with acid gases. Preferably, the water soluble trialkanolamine is incorporated into the 2-(2-aminoethoxy) ethanol in an amount of between about 1 to about 10 weight percent for within this range the water soluble trialkanolamine provides effective stability yet does not substantially reduce the overall concentration of the 2-(2-aminoethoxy) ethanol in the resultant compound. Thus for economic reasons, the optimum range is 1–10% by weight of the 2-(2-aminoethoxy) ethanol.

Although the water soluble trialkanolamines of the present invention may be incorporated into 2-(2-aminoethoxy) ethanol in any matter known in the art, we prefer to add the component to an aqueous solution of 2-(2-aminoethoxy) ethanol. 2-(2-aminoethoxy) ethanol is usually utilized in conventional "sweetening" of natural gas processes in an aqueous solution. Any concentration of the aqueous solution may be utilized that is desirable so long as the trialkanolamine component is incorporated in an amount of about 1–50% by weight, preferably 1–10% by weight, based upon the weight of the 2-(2-aminoethoxy) ethanol.

When removing acid gas impurities from natural gas, the natural gas can be contacted with or exposed to the improved 2-(2-aminoethoxy) ethanol compound of the present invention in any manner known in the art utilizing any type of conventional contacting apparatus. As mentioned hereinbefore, the inventive compound is effective in absorbing and removing the acid gas impurities without substantial formation, if any, of the urea BHEEU. By preventing or substantially reducing the formation of BHEEU in the practice of the present invention the lifetime of the improved 2-(2-aminoethoxy) ethanol compounds is greatly prolonged. Accordingly, the effectiveness of removing the acid gas impurities is enhanced. The improved stabilized compound is particularly useful in treating gases high in carbon dioxide impurities but it is also effective in removing other acid gas impurities, e.g., hydrogen sulfide, carbonyl sulfide, and the like, without substantial degradation even after extended exposure.

The following examples are for purposes of illustration of our invention and are not intended to be limiting thereof.

EXAMPLE I

To a 1400 ml. rocking autoclave was charged 520 g. of 2-(2-aminoethoxy) ethanol and 280 g. of water. 80 g. of carbon dioxide was then added and the autoclave was pressurized to 500 p.s.i.g. with methane. After agitation was started, the autoclave was heated to 120° C. and held at that temperature for approximately three weeks. Samples were taken before heating started and at the end of each week. The samples were analyzed for bis-(2-hydroxyethoxyethyl) urea (BHEEU) content by gel permeation chromatography (GPC).

| Sample | Heating time (hours) | Percent BHEEU |
|---|---|---|
| 1 | 0 | <1 |
| 2 | 168 | 1 |
| 3 | 332 | 3.5 |
| 4 | 496 | 3.8 |

This example illustrates the steady increase in BHEEU content when a 2-(2-aminoethoxy) ethanol aqueous solution is used under normal operating conditions for removal of carbon dioxide from methane.

EXAMPLE II

To the autoclave of Example I, 520 g. of 2-(2-aminoethoxy) ethanol, 280 g. of water and 52 g. of triethanolamine were added. 80 g. of carbon dioxide was then added and the autoclave was pressurized to 500 p.s.i.g. with methane and again heated to 120° C. for approximately three weeks. Samples were taken before heating started and at the end of each week of heating and analyzed for BHEEU content. The BHEEU content was determined by GPC per Example I. The following table illustrates the stabilizing effect of triethanolamine addition for preventing the formation of BHEEU during the period studied.

| Sample | Heating time (hours) | Percent BHEEU |
|---|---|---|
| 1 | 0 | <1 |
| 2 | 167 | <1 |
| 3 | 328 | <1 |
| 4 | 561 | <1 |

EXAMPLE III

Example I was repeated except that 5.2 g. of triethanolamine was added to the autoclave with the aqueous 2-(2-aminoethoxy) ethanol. The samples were analyzed for percent urea by gel permeation chromatography per Example I.

| Sample | Heating time (hours) | Percent BHEEU |
|---|---|---|
| 1 | 0 | <1 |
| 2 | 161 | <1 |
| 3 | 324 | <1 |
| 4 | 489 | <1 |

The above table shows that even 1% triethanolamine, based on the weight of 2-(2-aminoethoxy) ethanol, is effective for preventing the conversion of the 2-(2-aminoethoxy) ethanol to BHEEU.

EXAMPLE IV

To a 1400 ml. rocking autoclave was charged 520 g. of 2-(2-aminoethoxy) ethanol, 50 g. of $H_2S$, 80 g. of $CO_2$ and 280 g. of $H_2O$. The autoclave was pressurized to 500 p.s.i.g. with methane and then heated to 120° C. and held for three weeks. Samples of the aqueous solution were taken before heating started and at the end of each week. The samples were analyzed for BHEEU by gel permeation chromatography (GPC).

| Sample | Heating time (hours) | Percent BHEEU |
|---|---|---|
| 1 | 0 | <1 |
| 2 | 140 | 10.4 |
| 3 | 391 | 9.7 |
| 4 | 556 | 10.3 |

EXAMPLE V

The process of Example IV was repeated except that 52 g. of triethanolamine was also charged to the autoclave. Analysis for BHEEU per Example IV gave the following results:

| Sample | Heating time (hours) | Percent BHEEU |
|---|---|---|
| 1 | 0 | <1 |
| 2 | 140 | 5.6 |
| 3 | 306 | 7.1 |
| 4 | 493 | 7.7 |

Comparison of the above analytical results with the analytical results of Example IV clearly illustrates that urea formation is substantially reduced by the incorporation of triethanolamine into the 2-(2-aminoethoxy) ethanol aqueous solution.

EXAMPLE VI

The process of Example II was repeated except that triisopropanolamine was added to the autoclave in place of triethanolamine. No urea could be detected by gel permeation chromatography analysis in any of the samples.

Obviously many modifications and variations of the invention as hereinbefore set forth may be made without departing from the spirit and scope thereof, and, therefore, only such limitations should be imposed as are indicated in the claims.

We claim:
1. A method of stabilizing 2(2-aminoethoxy)ethanol in the presence of acid gases which comprises incorporating into said 2-(2-aminoethoxy)ethanol a stabilizing amount of a trialkanolamine, said trialkanolamine being a tri-(lower alkanol)amine having 2 to about 4 carbon atoms per lower alknol group.
2. A method according to Claim 1, wherein said trialkanolamine is incorporated into said 2-(2-aminoethoxy) ethanol in an amount of between about 1 to about 50 weight percent, based upon the weight of said 2-(2-aminoethoxy) ethanol.
3. A method according to Claim 1, wherein said trialkanolamine is a compound selected from the group consisting of triethanolamine, triisopropanolamine, diethanolisopropanolamine, and mixtures thereof.
4. A method according to Claim 2, wherein said trialkanolamine is incorporated in an amount of between about 1 to about 10 weight percent, based upon the weight of said 2-(2-aminoethoxy) ethanol.
5. A method according to Claim 4, wherein said trialkanolamine is triethanolamine.
6. A method according to Claim 4, wherein said trialkanolamine is triisopropanolamine.
7. A process according to Claim 1, wherein said trialkanolamine is incorporated into an aqueous solution of 2-(2-aminoethoxy) ethanol.
8. An improved composition which has improved stability against degradation in the presence of acid gases, said composition comprising 2-(2-aminoethoxy)ethanol and from 1 to about 50 weight percent, based upon the weight of said 2-(2-aminoethoxy)ethanol, of a trialkanolamine, said trialkanolamine being a tri-(lower alkanol) amine having 2 to about 4 carbon atoms per lower alkanol group.
9. The improved composition of Claim 8, wherein said trialkanolamine is a compound selected from the group consisting of triethanolamine, triisopropanolamine and mixtures thereof.
10. The improved composition of Claim 8, wherein said compound is an aqueous solution and said trialkanolamine is triethanolamine.

References Cited

UNITED STATES PATENTS 2,712,978   7/1955   Blohm et al. _____ 423—228

OTHER REFERENCES

Holder: Oil and Gas Journal, May 2, 1966, pp. 83–86.

ELBERT L. ROBERTS, Primary Examiner

D. R. PHILLIPS, Assistant Examiner

U.S. Cl. X.R.

260—584 R, 584 B; 423—228

UNITED STATES PATENT OFFICE
CERTIFICATE OF CORRECTION

Patent No. 3,829,494                           Dated August 13, 1974

Ernest Leon Yeakey
and
Philip Hotchkiss Moss
Assignors to Jefferson Chemical Company, Inc.
Houston, Texas, a corporation of Delaware It is certified that error appears in the above-identified patent and that said Letters Patent are hereby corrected as follows:

Change the title from "STABILIZED 2-(2-AMINO ETHER) ETHANOL AND METHANE" to -- STABILIZATION OF 2-(2-AMINOETHOXY) ETHANOL --.

Signed and sealed this 21st day of January 1975.

(SEAL)
Attest:

McCOY M. GIBSON JR.                C. MARSHALL DANN
Attesting Officer                  Commissioner of Patents